United States Patent [19]
Fukuda

[11] Patent Number: 5,737,325
[45] Date of Patent: Apr. 7, 1998

[54] CONNECTION METHOD OF DIGITAL CORDLESS TELEPHONE APPARATUS

[75] Inventor: Kunio Fukuda, Tokyo, Japan

[73] Assignee: Sony Corporation, Tokyo, Japan

[21] Appl. No.: 568,647

[22] Filed: Dec. 7, 1995

[30] Foreign Application Priority Data

Dec. 9, 1994 [JP] Japan ..................... 6-306499

[51] Int. Cl.$^6$ ..................... H04Q 7/38
[52] U.S. Cl. ............ 370/337; 370/442; 370/459; 455/426; 455/509
[58] Field of Search ............ 370/336, 337, 370/345, 347, 311, 277–280, 442, 458, 459, 501; 379/61; 455/426, 434, 450, 464, 509, 518, 519

[56] References Cited

U.S. PATENT DOCUMENTS

| | | | |
|---|---|---|---|
| 4,939,769 | 7/1990 | Sakanishi | 379/61 |
| 5,287,551 | 2/1994 | Gustafson, Jr. et al. | 455/54.1 |
| 5,495,508 | 2/1996 | Kaewell | 370/347 |
| 5,515,366 | 5/1996 | Chieu | 370/347 |
| 5,519,763 | 5/1996 | Namekawa | 379/61 |
| 5,636,243 | 6/1997 | Tanaka | 375/219 |

FOREIGN PATENT DOCUMENTS

| | | |
|---|---|---|
| 2287612 | 9/1995 | United Kingdom . |
| WO 94/05101 A1 | 3/1994 | WIPO . |
| WO 95/01679 A1 | 1/1995 | WIPO . |
| WO95/06395 A1 | 1/1995 | WIPO . |

*Primary Examiner*—Douglas W. Olms
*Assistant Examiner*—Matthew C. Phillips
*Attorney, Agent, or Firm*—Jay H. Maioli

[57] ABSTRACT

A connection method of a digital cordless telephone apparatus allows communication between a first calling side portable unit and a second called side portable unit of the plurality of portable units. The first portable unit transmits an access request signal for requesting a call to the second portable unit. A base unit receives an access request signal and determines whether or not there are any transmission slots and reception slots available for connecting the first portable unit to the second portable unit via the base unit. If there are the available transmission slots and reception slots, then the base unit uses usable slots to allow a call between the first portable unit and the second portable unit. If there are no available transmission slots and reception slots, then the base unit transmits a control signal including busy information. The first portable unit receives the control signal and transmits to the second portable unit a direct access request signal for requesting a call to the second portable unit. The second portable unit receives the direct access request signal, thereby communicating with the first portable unit.

4 Claims, 8 Drawing Sheets

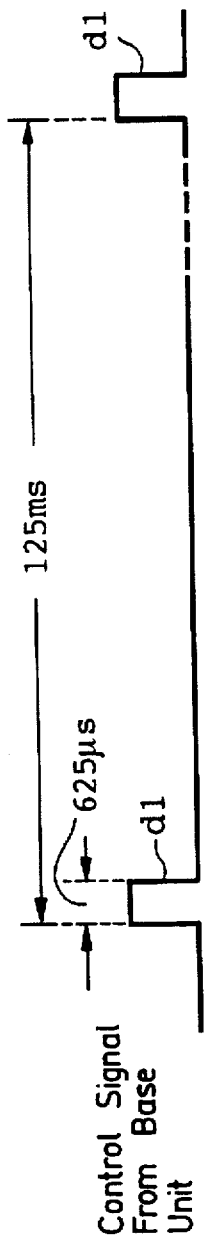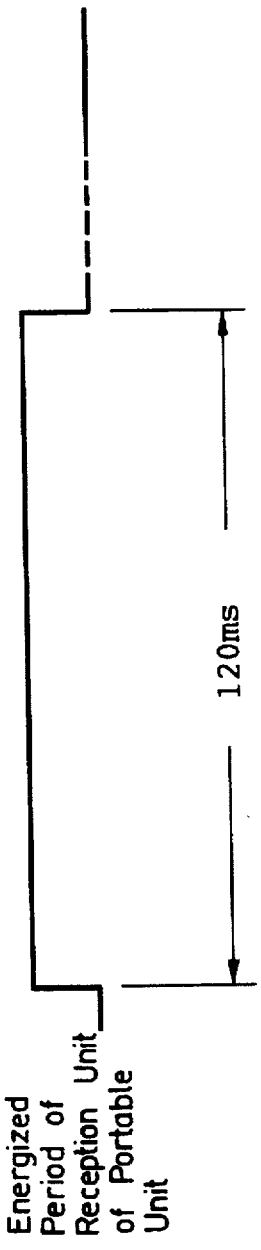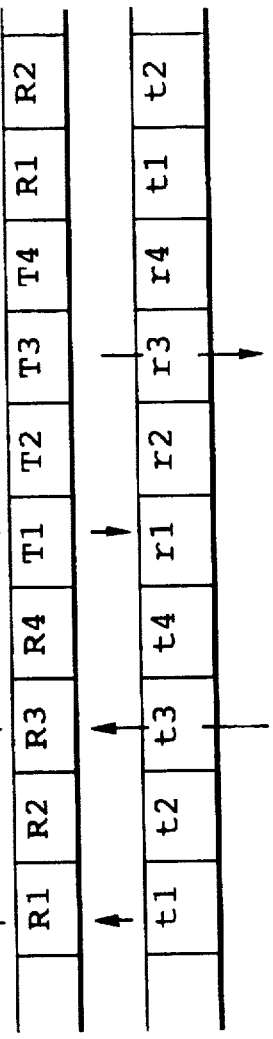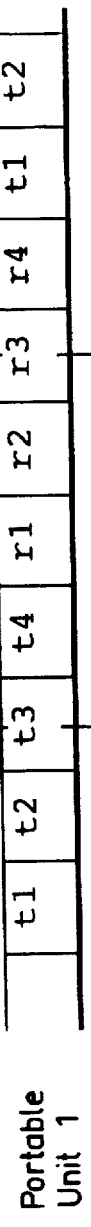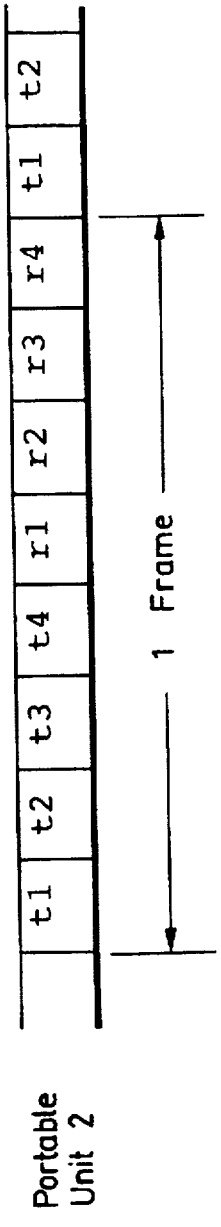
FIG. 3A  Control Signal From Base Unit
FIG. 3B  Energized Period of Reception Unit of Portable Unit
FIG. 4A  Base Unit
FIG. 4B  Portable Unit 1
FIG. 4C  Portable Unit 2

CONNECTION METHOD OF DIGITAL CORDLESS TELEPHONE APPARATUS

BACKGROUND OF THE INVENTION

1. Field of the Invention

The present invention relates to a connection method of a digital cordless telephone apparatus in which communication between a base unit and a portable unit and communication among a plurality of portable units are carried out by transmitting and receiving digital data.

2. Description of the Related Art

As shown in FIG. 1, a digital cordless telephone apparatus includes a base unit 1 and a plurality of portable units 2, 3 and 4. The base unit 1 serves as a base station. The base unit 1 is connected to a telephone line and has an antenna 1a for communicating with a plurality of portable units 2 to 4. The portable units 2, 3 and 4 have antennas 2a, 3a, and 4a, respectively, and radio communication therebetween can be carried out through the antenna 1a of the base unit 1 and the antennas 2a, 3a and 4a of the respective portable units 2, 3 and 4.

When the portable units 2, 3 and 4 communicate with the base unit 1 (or a telephone connected to the base unit 1 via the telephone line), each of the portable units 2, 3, and 4 transmits an access control signal of a predetermined format to the base unit 1 side. The portable units 2, 3, and 4 transmit and receive digitized audio data to and from the base unit 1 by using divided time slots of one channel. Thus, the portable units 2, 3, and 4 communicate with the base unit 1.

Some digital cordless telephone apparatus described above employ a time division duplex (TDD) communication system in which data is transmitted and received at the same frequency to carry out a so-called reciprocal transmission, or a time division multiplex access (TDMA) communication system.

In the TDD communication system, as shown in FIG. 2A, one channel (frequency) is divided into transmission slots T and reception slots R in view of a time interval, and each of the transmission slots T and the reception slots R are alternately and repeatedly located on one channel. A guard time (not shown) is provided between the transmission slot T and the reception slot R. In this case, each of the transmission slots T and the reception slots R has an interval of 1 msec., and the guard time has an interval of several tens of μsec. A portable telephone (the portable unit) transmits data to a base station (the base unit) during the transmission slot T and receives data from the base station during the reception slot R.

In the TDMA communication system which is an improved version of the TDD communication system, as shown in FIG. 2B, a plurality of pairs of transmission slots (T1 to T4) and reception slots (R1 to R4) form one frame on one channel. This allows multiple communications on one channel.

As described above, the TDMA system provides effective use of a frequency band allocated to a cordless telephone. When such communication is carried out, the base unit transmits control signals to the respective portable units at a predetermined period in accordance with a predetermined format. Specifically, as shown in FIG. 3A, the base unit transmits a control signal d1 to the portable units during a period of 625 μsec. at intervals of 125 msec. When the base unit calls any of the portable units through an extension call or the like, the base unit transmits an identification number of the corresponding portable unit on the control signal d1 to call the corresponding portable unit having the above identification number. If the portable unit receives only the control signal intermittently in its reception standby state in a predetermined period (e.g., once every 1.2 seconds), then it is possible to reduce a consumed power of the portable unit required for receiving the control signal in its reception standby state. Fundamentally, 625 μsec. is enough time for receiving one control signal. However, the portable unit practically receives one control signal during a period of about 10 msec. in consideration of some factors such as a start-up time of its reception unit. Accordingly, assuming that the portable unit receives one control signal during a period of 10 msec. at every interval of 1.2 seconds, a time during which the reception unit is operated is 1/120. Therefore, it is possible to drastically reduce the consumed power of the portable unit as compared with the time when the reception unit is operated continuously.

The portable unit of the digital cordless telephone apparatus not only responds to a call from the base unit but also can be used for an extension call between the portable units. This requires the portable units to check whether or not there is any call on all the channels for direct communication between the portable units. For example, assuming that ten frequencies (i.e., ten channels) are allocated to the channels for direct communication between the portable units, then the portable unit must check all ten channels in a predetermined period. Accordingly, as shown in FIG. 3B, if a time during which the reception unit of the portable unit in its reception standby state is energized is 120 msec. including 625 μsec. during which the control signal d1 is transmitted thereto from the base unit, it is necessary that during a time t1 (about 110 msec.) after the reception unit receives the control signal d1 from the base unit, the portable unit successively checks all the ten channels and determines whether or not there is a call from any of the other portable units (i.e., determine whether or not it has received a direct access request signal from any other portable unit). The time t1 when the portable unit checks the ten channels in this case is set to about 110 msec. in consideration of the fact that it takes about 10 msec. for the portable unit to check one frequency and it takes about 1 msec. to switch channels.

As described above, it disadvantageously takes a considerable time for the portable unit to check all the channels for direct communications between the portable units. For example, if the reception unit is energized during a period of 120 msec. at the interval of 1.2 seconds, this fact means that the reception unit is energized during a 1/10 time period. Accordingly, the consumed power of the portable unit in its reception standby state is considerably increased as compared with the power consumed when the portable unit does not check channels for direct communication between the portable units.

In order to solve the above problem, the same assignee of the present invention proposed a cordless telephone apparatus which allows communication between the portable units via the base unit (Japanese laid-open patent publication No. 129805/1993). As shown in FIGS. 4A, 4B and 4C, when communication between two portable units 1, 2 is carried out, the proposed cordless telephone apparatus is operated as follows. Specifically, the base unit receives data, such as audio data in one time slot of a call, transmitted from one portable unit 1 during a reception slot R1. The base unit transmits the received data to the other portable unit 2 during a transmission slot T3 of the base unit. The portable unit 2 receives the transmitted data. On the other hand, the base unit receives data, such as audio data in one time slot of a call, transmitted from the portable unit 2 during a reception slot R3. The base unit transmits the received data to the portable unit 1 during a transmission slot T1 of the base unit. The portable unit 1 receives the transmitted data.

Since the communication between the portable units is carried out via the base unit as described above, each of the portable units does not need to receive a call request signal directly transmitted from another portable unit in its reception standby state. If each of the portable units receives only the control signal from the base unit in its reception standby state, then it is possible for each of the portable units to communicate with the base unit and carry out the communication between the portable units via the base unit.

However, in the communication between the portable units via the base unit, when the base unit has no free time slots because the base unit communicates with another portable unit, there is then the disadvantage that the communication between the portable units becomes impossible. Specifically, as shown in FIGS. 4A, 4B and 4C, it is assumed that communication between the portable units 1, 2 is carried out via the base unit during reception slots R1, R3 and transmission slots T1, T3 of the base unit and the base unit communicates with another portable unit during its reception slot R2 and its transmission slot T2. At this time, the base unit has only two time slots, its reception slot R4 and its transmission slot T4. As a result, even if the base unit receives from yet another portable unit a request for communication between portable units, it is impossible for the base unit to satisfy the request.

The description has hitherto been made on the assumption that all of 8 time slots prepared in one frame can be used. Practically, it is frequently observed that a performance of the base unit limits use of all the time slots prepared in one frame. For example, the base unit sometimes reaches the limit of its performance when one communication between the portable units is carried out with four time slots occupied shown in FIG. 4. Even in this case, the base unit cannot satisfy any request from another portable unit for another communication between portable units via the base unit.

Moreover, in the communication between the portable units via the base unit, there is then the disadvantage that both of two portable units, to carry out the communication between the portable units, must be located within an area which a radio wave from the base unit ranges and that if either of the two portable units is located out of the area, the communication between the portable units is impossible. Specifically, the digital cordless telephone apparatus of this kind basically has a communication performance which allows a transmitted radio wave to reach a place about 100 m away from the base unit. If a distance between the two portable units is 100 m or less, then it is possible to carry out direct communication between the two portable units. However, the communication between the portable units via the base unit is carried out only if both of the portable units are located within a 100-m range from the base unit. Thus, such a restriction limits an area where the communication between the portable units via the base unit is possible.

SUMMARY OF THE INVENTION

In view of such aspects, an object of the present invention is to propose a connection method of a digital cordless telephone apparatus which allows satisfactory communication between portable units in any state.

A connection method of a digital cordless telephone apparatus according to the present invention is applied to a digital cordless telephone apparatus described below. The digital cordless telephone apparatus includes a base unit and a plurality of portable units. One channel is divided into frames in view of time, each frame being formed of a plurality of transmission slots and a plurality of reception slots. A digital data is transmitted and received during respective periods of the transmission slots and the reception slots. By using the plurality of transmission slots and reception slots in each of the frames, the base unit can communicate with the plurality of portable units and provide communication between one portable unit and another portable unit of the plurality of portable units via the base unit.

The connection method according to the present invention is used to establish a connection for communication between a first calling side portable unit and a second called side portable unit of the plurality of portable units.

According to a first aspect of the present invention, the first portable unit transmits an access request signal for requesting a call to the second portable unit. The base unit receives the access request signal and determines whether or not there are any transmission slots and reception slots available for connecting the first portable unit to the second portable unit via the base unit. If there are available transmission slots and reception slots, then the base unit uses usable slots to allow a call between the first portable unit and the second portable unit by using the available slots. If there are no available transmission slots and reception slots, then the base unit transmits the control signal including busy information. The first portable unit receives the control signal and transmits to the second portable unit a direct access request signal for requesting a call to the second portable unit. The second portable unit receives the direct access request signal, thereby communicating with the first portable unit.

According to a second aspect of the present invention, portable units other than the first portable unit among the plurality of portable units are brought in their standby state for reception of the direct access request signal when receiving the control signal including the busy information.

According to a third aspect of the present invention, the first portable unit determines whether or not it is possible to receive a control signal from the base unit. If the first portable unit cannot receive the control signal, then the first portable unit transmit the direct access request signal to the second portable unit. The second portable unit receives the direct access request signal to thereby communicate with the first portable unit.

According to a fourth aspect of the present invention, when the first portable unit of the plurality of portable units determines that it cannot receive the control signal, portable units other than the first portable unit are brought in their standby state for reception of the control signal and the direct access request signal.

BRIEF DESCRIPTION OF THE DRAWINGS

FIGS. 3A and 3B are diagrams showing a timing at which a base unit transmits a control signal and a timing at which a reception unit of the portable unit is energized;

FIGS. 4A, 4B and 4C are diagrams showing a processing of a communication between portable units via the base unit;

DESCRIPTION OF THE PREFERRED EMBODIMENT

A connection method of a digital cordless telephone apparatus according to an embodiment of the present invention will hereinafter be described with reference to FIGS. 5 to 11.

Figure 5:
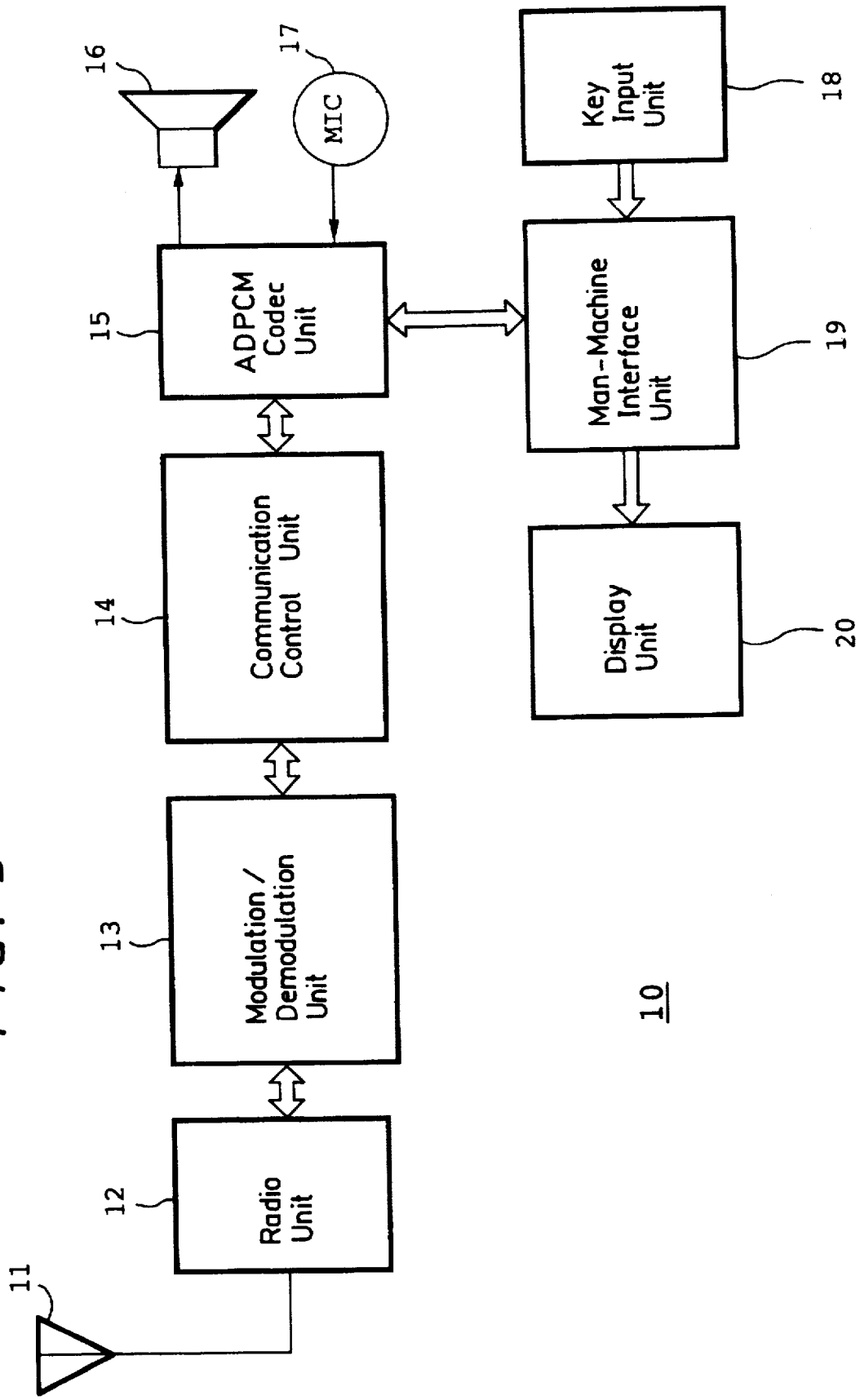
FIG. 5 is a diagram showing an arrangement of a portable unit of a digital cordless telephone apparatus to which the present invention is applied.

In this embodiment, the present invention is applied to a TDMA communication system digital cordless telephone apparatus which is similar to that described above. A portable unit 10 of the digital cordless telephone apparatus is arranged as shown in FIG. 5. As shown in FIG. 5, the portable unit 10 has an antenna 11, a radio unit 12, a modulation/demodulation unit 13, a communication unit 14, an adaptive differential pulse code modulation (ADPCM) codec unit 15, a speaker unit 16, and a microphone 17. The antenna 11 receives a digital data transmitted from a base unit or another portable unit and supplies the received digital data to the radio unit 12. The radio unit 12 subjects the received digital data to reception processing and supplies the digital data to the modulation/demodulation unit 13. The modulation/demodulation unit 13 demodulates the received digital data and supplies the demodulated data through the communication unit 14 to the ADPCM codec unit 15. The ADPCM codec unit 15 converts the received ADPCM digital data into an analog audio signal and supplies the analog audio signal to the speaker unit 16. The speaker unit 16 converts the analog audio signal into sounds and emanates the sounds.

A sound or an audio signal picked up by the microphone 17 is supplied to the ADPCM codec unit 15. The ADPCM codec unit 15 converts the supplied analog audio signal into a digital data and supplies the digital data through the communication control unit 14 to the modulation/demodulation unit 13. The modulation/demodulation unit 13 modulates the digital data for transmission and supplies the modulated digital data to the radio unit 12. The radio unit 12 supplies the modulated data to the antenna 11. The antenna 11 transmits the modulated digital data in the form of a radio wave.

The portable unit 10 has a key input unit 18, a man-machine interface unit 19, and a display unit 20. The key input unit 18 is connected through the man-machine interface unit 19 to the ADPCM codec unit 15, thereby operation information from the key input unit 18 is being supplied to the communication control unit 14 side. Moreover, the display unit 20 is connected to the man-machine interface unit 19, thereby displaying thereon some information such as an operation state or the like.

When the portable unit 10 is in its reception standby state, the communication control unit 14 controls a reception operation in its first operation state such that the portable unit 10 receives only a control signal transmitted from the base unit on a predetermined channel at a predetermined interval. The communication control unit 14 controls the reception operation in its second operation state such that the portable unit 10 receives the control signal from the base unit at a predetermined interval and receives a direct access request signal transmitted directly from another portable unit at a predetermined interval. It will be described later on how the communication control unit 14 switches the reception operation in the reception standby state of the portable unit 10.

The communication control unit 14 discriminates contents of the received control signal. As a result of the discrimination, if the communication control unit 14 determines that this portable unit 10 is being called based on an access request signal included in the control signal or determines that this portable unit 10 is being called based on the direct access request signal from another portable unit, then this portable unit 10 is operated to carry out processing corresponding to the request signal under the control of the communication control unit 14. When the base unit calls the respective portable unit by transmitting the access request signal, the called portable unit sometimes communicates with the base unit for an extension call or an outside call and sometimes communicates with another portable unit for an extension call.

When a user intends to make an outside call or an extension call (i.e., an extension call to the base unit and an extension call between portable units) from the portable unit, under the control of the communication control unit 14, the portable unit 10 transmits an access request signal to the base unit on the control channel. However, when the user intends to make an extension call between portable units, if the control signal transmitted from the base unit indicates that the base unit is in its busy state (this busy state will be described later on) or if the portable unit 10 cannot receive the control signal from the base unit, under the control of the communication control unit 14, the portable unit 10 uses a channel for direct communication with another portable unit (any one of ten channels for direct communication prepared on ten frequencies) and transmits a direct access request signal to another portable unit.

Figure 6:
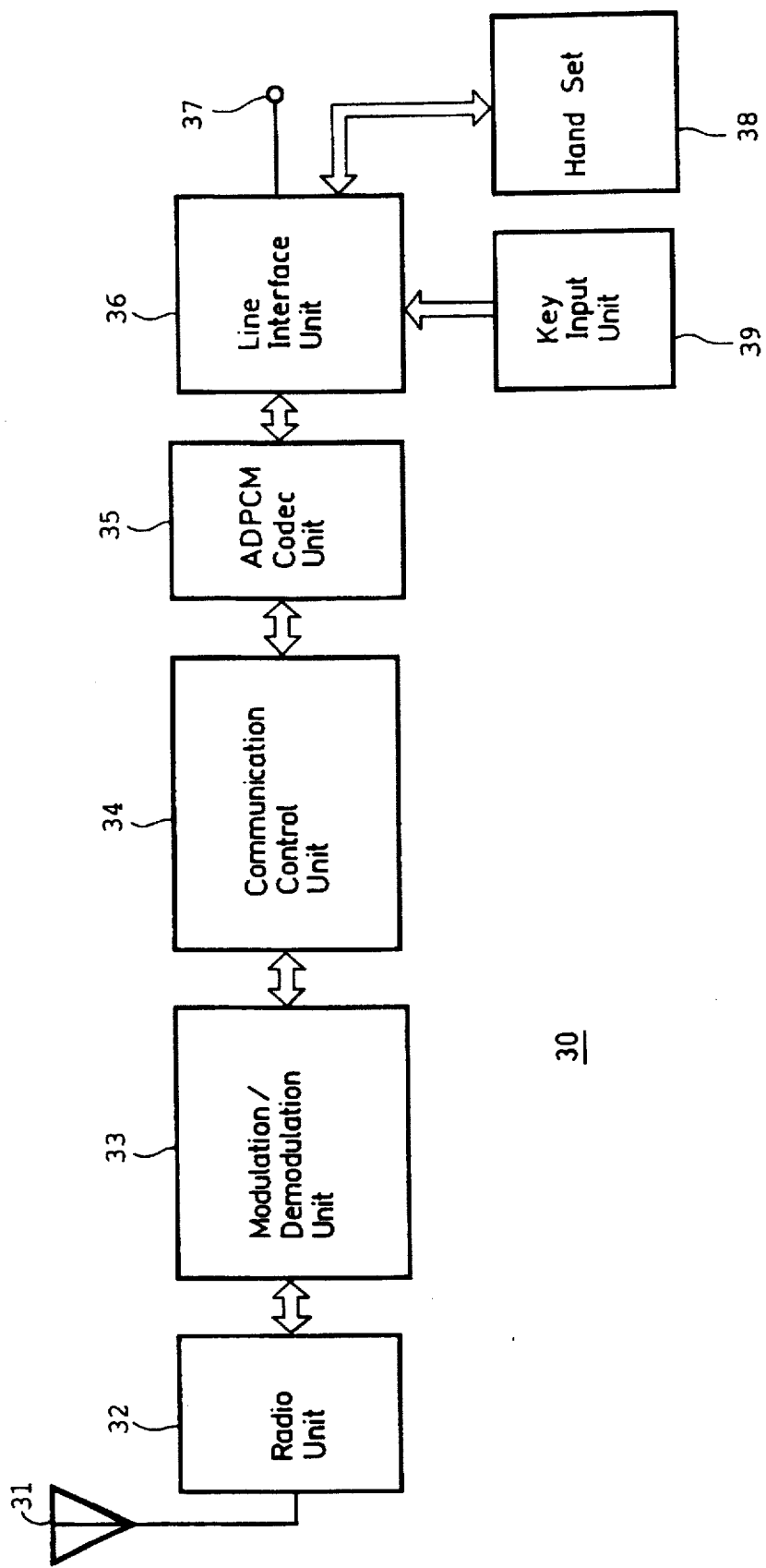
FIG. 6 is a diagram showing an arrangement of a base unit of a digital cordless telephone apparatus to which the present invention is applied.

FIG. 6 shows an arrangement of the base unit 30. The base unit 30 has an antenna 31, a radio unit 32, a modulation/demodulation unit 33, a communication control unit 34, an ADPCM codec unit 35, a line interface unit 36, and an analog telephone line connection terminal 37. Similarly to the portable unit 10, the antenna 31 receives an ADPCM digital data and supplies the received digital data to the radio unit 32. The radio unit 32 subjects the received digital data to a reception processing and supplies the digital data to the modulation/demodulation unit 33. The modulation/demodulation unit 33 demodulates the supplied digital data and supplies the demodulated digital data through the communication control unit 34 to the ADPCM codec unit 35. The ADPCM codec unit 35 converts the ADPCM digital data into an analog audio signal and supplies the analog audio signal to the line interface unit 36. The line interface unit 36 supplies the analog audio signal to the analog telephone line connection terminal 37 side.

An analog audio signal obtained from the analog telephone line connection terminal 37 side is supplied through the line interface unit 36 to the ADPCM codec unit 35. The ADPCM codec unit 35 converts the supplied analog audio signal into the ADPCM digital data and supplies the digital data through the communication control unit 34 to the modulation/demodulation unit 33. The modulation/demodulation unit 33 modulates the digital data for transmission and supplies the modulated digital data to the radio unit 32. The radio unit 32 supplies the digital data to the antenna 31 which transmits the digital data in the form of a radio wave.

The base unit 30 has a hand set 38 and a key input unit 39. The hand set 38 is connected directly to the line interface unit 36, thereby the base unit making an outside call through the analog telephone line connection terminal 37. The hand set 38 is connected to the ADPCM codec unit 35 side, thereby the base unit making unit. Moreover, the key portable unit. Moreover, the key input unit 39 is connected to the line interface unit 36, thereby the user carrying out various controls such as making an outside call or the like.

The communication control unit 34 of the base unit 30 transmits the control signal to the portable units at a predetermined interval on a channel (a frequency band) prepared for exclusive use for a control signal transmission. The base unit 30 calls the portable units by transmitting the control signals thereto. When the base unit 30 is in its reception standby state, the communication control unit 34 detects whether or not the access request signal for communication between the portable units is transmitted from any portable unit. When the base unit receives this access request signal indicative of a request to carry out communication between the base unit and the portable unit, the base unit 30 transmits the control signal to the corresponding portable unit in order to designate a call channel or the like, thereby commencing the communication between the base unit 30 and the corresponding portable unit. When the base unit 30 receives the access request signal indicative of a request to carry out communication between portable units from a portable unit (a calling portable unit), under the control of the communication control unit 34, the base unit 30 transmits an access request signal indicative of commencement of the communication between portable units to a called portable unit by transmitting the control signal on the control channel.

Figure 1:
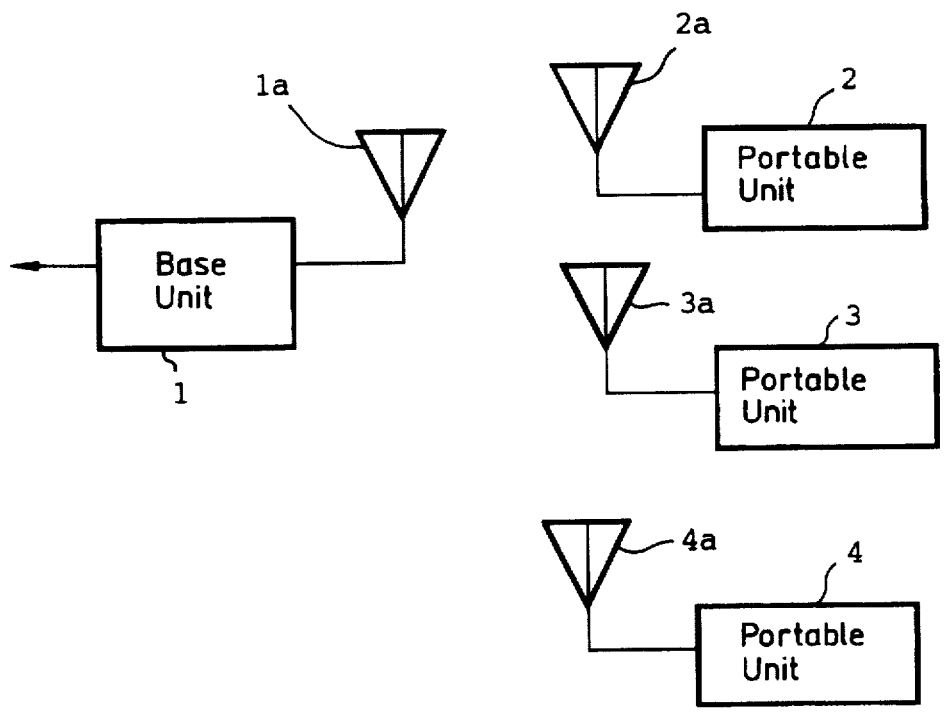
FIG. 1 is a diagram showing a systematic arrangement of a cordless telephone apparatus.
Figure 2A:
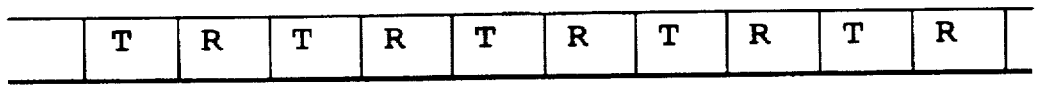
FIGS. 2A and 2B are diagrams respectively showing a TDD communication system and a TDMA communication system.
Figure 2B:
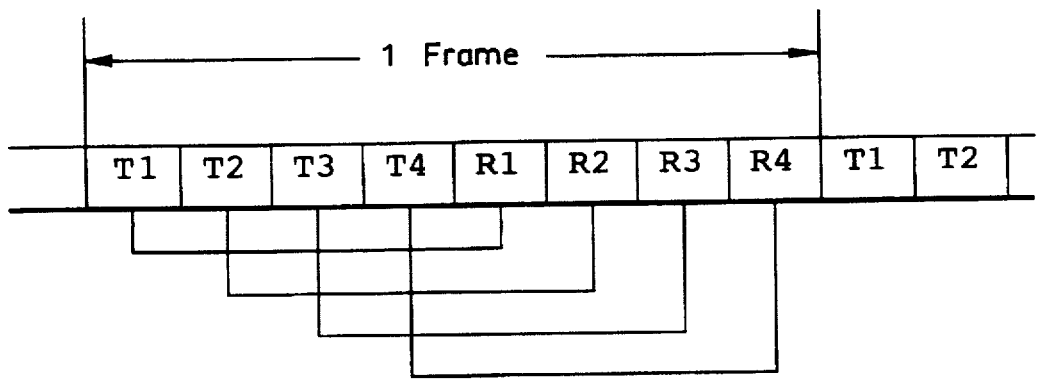

When the base unit 30 according to this embodiment uses all the time slots prepared for communication with the portable units and has no free slots, the base unit transmits the control signal including information indicative of its busy state (hereinafter referred to as busy information). Specifically, in this embodiment, one frame includes eight time slots, i.e., four transmission slots T1 to T4 and four reception slots R1 to R4 as shown in FIG. 2B. When the base unit uses all the eight time slots for communication with the portable units, the base unit transmits the control signal including the busy information indicating that all the time slots are occupied. When the base unit uses six time slots for communication with the portable units and only one transmission slot and one reception slot are not occupied, the base unit transmits the control signal including the busy information indicating that six slots are occupied.

Figure 7:
FIG. 7 is a diagram showing an arrangement of a control signal according to an embodiment of the present invention.
Figure 8:
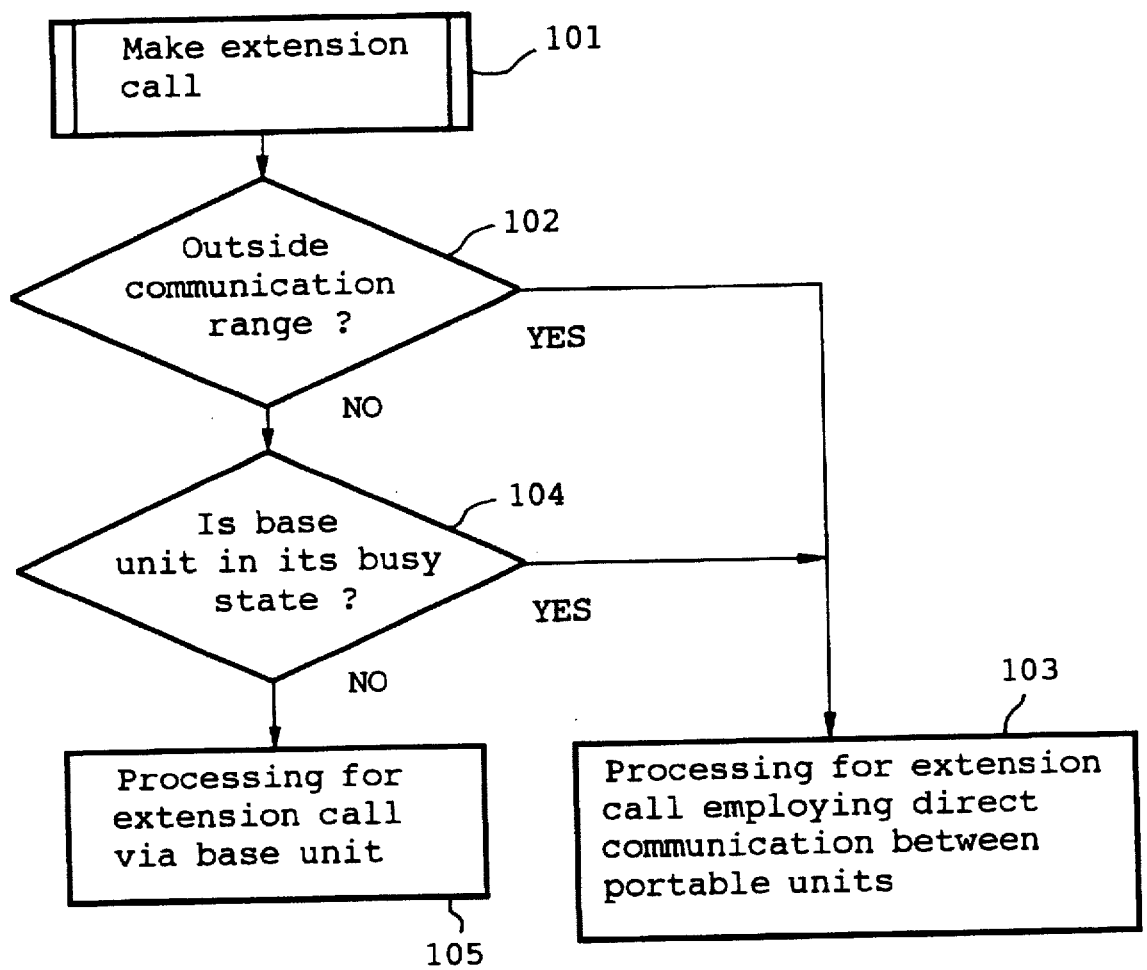
FIG. 8 is a flowchart showing a processing of the portable unit for making an extension call according to the embodiment of the present invention.

An arrangement of the control signal transmitted with such busy information will be described with reference to FIG. 7. The base unit transmits the control signal having a duration of 625 μsec. at a cycle of 125 msec. on the control channel prepared for the control signal transmission. One control signal having a duration of 625 μsec. is arranged as shown in FIG. 7. The control signal includes a preamble PR having a predetermined pattern continued during a predetermined period, a unique word UW having a specific pattern indicating that the signal is the control signal, a channel identification number CI indicative of a channel used for the communication, a control data CAC indicative of control contents, and an error-detection parity CRC in this order. The base unit transmits the control signal including the busy information by using predetermined bits of the control data CAC.

The base unit transmits such a control signal and receives the access request signal transmitted from the portable units during a predetermined period. When the base unit receives the access request signal transmitted from the portable unit, the base unit discriminates contents of the access request signal (e.g., an outside call, an extension call to the base unit, an extension call to another portable unit, and so on) and allocates time slots to communication with the corresponding portable unit. If the discriminated contents of the access request signal is the request of communication between the corresponding portable unit and another portable unit, then the base unit further allocates time slots to communication with another portable unit.

The base unit uses allocated time slots to transmit and receive data, such as audio data or the like, to and from the portable unit, thereby carrying out communication to make an outside call or an extension call.

A call processing required upon an extension call from one portable unit (the calling portable unit) to the other portable unit (the called portable unit) will be described. In this embodiment, the portable unit according to this embodiment can make an extension call to another portable unit via the base unit on the transmission channel provided between the base unit and the calling portable unit and also can make an extension call directly to another portable unit on the channel for direct communication between portable units. The communication control unit 14 of the calling portable unit selects one of the above-mentioned communication systems of an extension call between the portable units in accordance with a processing shown in FIG. 8 which is a flowchart. Specifically, in step 101, the user gives an instruction to make an extension call to the communication control unit 14 of the portable unit. The processing proceeds to step 102. In step 102, the corresponding portable unit tries to detect the control signal transmitted from the base unit on the control channel to thereby determine whether or not it can receive the control signal. If it is determined in step 102 that the corresponding portable unit cannot receive the control signal from the base unit, the communication control unit 14 determines that the corresponding portable unit is located out of a range to receive a radio wave transmitted from the base unit (i.e., outside of a communication range). Then, the processing proceeds to step 103. In step 103, the corresponding portable unit transmits the direct access request signal to the called portable unit to call the called portable unit and carries out a call processing for the direct extension call between the portable units. In this case, a plurality of the channels (e.g., ten channels) for direct communication between portable units are prepared. The calling portable unit uses any one of the channels to transmit the direct access request signal to the called portable unit.

If it is determined in step 102 that the calling portable unit can receive the control signal from the base unit and hence it is located within the communication range, then the processing proceeds to step 104. In step 104, the communication control unit 14 of the corresponding portable unit discriminates the contents of the received control signal to determine whether or not the busy information is included in the control signal. If it is determined in step 104 that any of the busy information is included, then it means that the base unit has no free time slot which can be used for the extension call. In this case, the processing proceeds to step 103. In step 103, as described above, the corresponding portable unit transmits the direct access request signal to the called portable unit to call the called portable unit and carries out the call processing for the direct extension call between the portable units.

Moreover, if it is determined in step 104 that the busy information is not included in the received control signal, then the processing proceeds to step 105. In step 105, the corresponding portable unit transmits the control signal including the access request signal for communication between the portable units to the base unit, thereby carrying out the processing for the extension call between the portable units via the base unit.

Since the portable unit carries out such call processing for the extension call, the portable unit gives priority to the call processing for communication between the portable units via the base unit when the call processing for communication between the portable units via the base unit is possible. Only when the call processing for communication between the portable units via the base unit is impossible because the corresponding unit is located outside the communication range or because the base unit is in its busy state, the portable unit automatically switches the call processing to the call processing for direct communication between the portable units.

A processing of the portable unit in its reception standby state that the portable unit waits for a call from the base unit or another portable unit will be described with reference to FIG. 9 which is a flowchart. It is when the portable unit is energized (in step 201) and when the portable unit finishes the call (extension call or outside call) (in step 202) that the corresponding portable unit is brought in its reception standby state. In each of the above cases, the processing proceeds to step 203. In step 203, under the control of the communication control unit 14 of the portable unit, the portable unit carries out an acquisition processing for reception of the control signal intermittently transmitted from the base unit. The portable unit carries out the acquisition processing by trying to continuously receive a signal on the control channel for two seconds. The processing proceeds to step 204. In step 204, the communication control unit 14 determines whether or not the control signal is received.

If it is determined in step 204 that the control signal is received, the processing proceeds to step 205. In step 205, the portable unit intermittently receives the control signal with reference to a timing at which the control signal is received in the processing of step 204. This intermittent reception of the control signal is carried out as follows. Specifically, when the control signal transmitted from the base unit is a signal having a duration of 625 μsec. transmitted at an interval of 125 msec. as shown in FIG. 10A, the reception unit of the portable unit is energized from a reception-unit start-up period located a little before a timing at which the control signal is to be received (a period $B_1$ shown in FIG. 10B, whose interval is about 9 msec.). Thus, the reception unit tries to receive the control signal during a period (a period $B_2$ shown in FIG. 10B) when the control signal is transmitted. The portable unit carries out the intermittent reception shown in FIG. 10B at a cycle of about 1.5 second, for example.

The processing proceeds to step 206. In step 206, it is determined whether or not the control signal obtained by the intermittent reception includes the busy information (i.e., whether or not the base unit is in its busy state). If it is determined in step 206 that the control signal does not include the busy information, then the processing proceeds to step 207. In step 207, the portable unit continues to receive only the control signal intermittently (i.e., continuously carries out only the intermittent reception of the control signal as shown in FIG. 10B).

If it is determined in step 206 that the control signal received by the intermittent reception includes the busy information, then the processing proceeds to step 208. In step 208, the reception unit carries out another intermittent reception in order to carry out the acquisition processing for reception of the control signal and carry out check processing for checking transmission of any direct access request signal from another portable unit. In step 208, the portable unit carries out this intermittent reception as follows. Specifically, as shown in FIG. 10C, the reception unit carries out reception for 120 msec. during one intermittent reception. After a reception-unit start-up period $C_1$ has passed, the reception unit tries to receive the control signal during a control-signal transmission period $C_2$. During a direct-access-request-signal check period $C_3$ of 110 msec. after the period $C_2$, the reception unit checks transmission of any direct access request signal from another portable unit. When the reception units carries out the check processing during the direct-access-request-signal check period $C_3$ of 110 msec., the reception unit successively checks each of the ten channels for the direct communication between the portable units during an interval of 10 msec. It takes about 1 msec. to change the reception channel. Therefore, it takes about 110 msec. as a total to check all ten channels. This reception carried out during a period of 120 msec. is carried out at a cycle of about 1.5 seconds.

After the processing in step 207 or step 208 is finished, the processing proceeds to step 209. In step 209, it is determined whether or not the reception unit fails to receive the control signal in three successive intermittent reception times. If it is determined in step 209 that the control signal is not received in each of the three successive intermittent reception times or that the control signal cannot be received in two successive intermittent reception times or less, then the processing is returned to step 206. Then, the processing for determining whether or not the control signal includes the busy information and the processing for receiving the control signal or the direct access request signal in step 207 or step 208 depending upon the above determination in step 206 are carried out repeatedly.

If it is determined in step 209 that the reception unit fails to receive the control signal in the three successive intermittent reception times, then the processing is returned to step 203. Then, the processing for trying to receive the control signal for two seconds and the succeeding processings are repeated.

Figure 11:
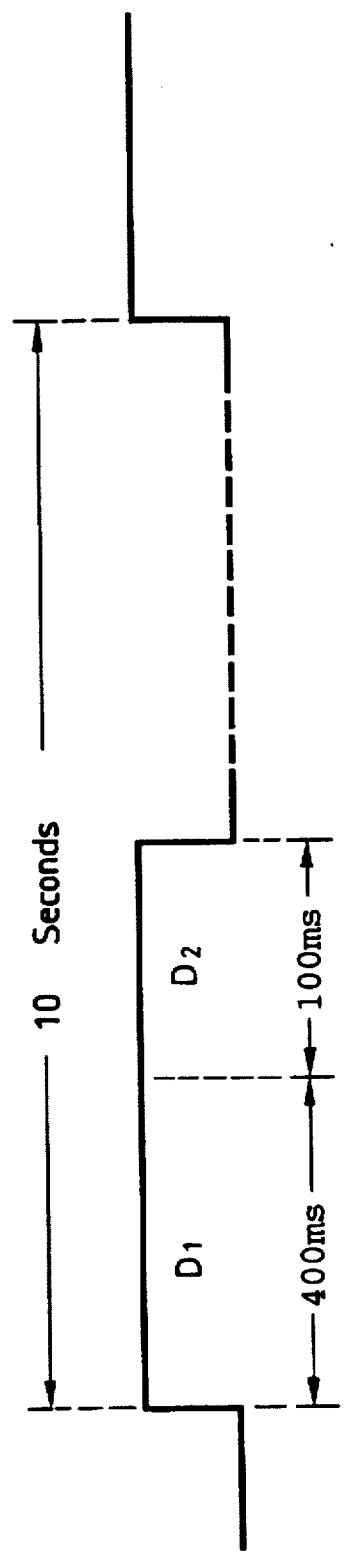
FIG. 11 is a diagram showing a timing at which the portable unit located outside a communication range carries out reception in its reception standby state.

If it is determined in step 204 that the reception unit cannot receive the control signal even by trying to receive a signal on the control channel for two successive seconds, then the communication control unit 14 determines that the portable unit is located outside the area which the radio wave from the base unit ranges (i.e., outside the communication range), and the processing proceeds to step 210. In step 210, a reception standby processing carried out when the portable unit is located outside the communication range is carried out. The processing proceeds to step 211. In step 211, this reception standby processing is carried out by carrying out intermittently both the acquisition processing for trying to receive the control signal on the control channel and check processing for successively checking each of the ten channels for direct communication between the portable units intermittently at a cycle of 10 seconds. Specifically, as shown in FIG. 11, the reception unit carries out one intermittent reception having a duration of 510 msec. every ten seconds. In this intermittent reception of 510 msec., the reception unit continuously tries to receive the control signal on the control channel during a first period $D_1$ of 400 msec. and successively checks each of the ten channels for direct communication between the portable units during the succeeding period $D_2$ of 110 msec. Then, the processing proceeds to step 212.

In step 212, it is determined whether or not the control signal is received on the control channel during the processing of reception outside the communication range. If it is determined in step 212 that the control signal is received, then the processing proceeds to step 205, in which the reception unit carries out the intermittent reception of the control signal with reference to the timing at which the control signal is received in the processing of step 211. If it is determined in step 212 that the control signal is not received, then the processing is returned to step 211, in which the reception standby processing for reception outside the communication range is repeatedly carried out at a cycle of 10 seconds.

As described above, the processing in the standby state of the portable unit is carried out under the control of the communication unit 14 thereof. If the corresponding portable unit is called based on the control signal received in any of the steps, then the corresponding portable unit transmits and receives a data to and from the base unit using the time slots indicated by the received control signal, thereby commencing a call (the outside call or the extension call). If the portable unit detects any direct access request signal indicative of the direct communication between the portable units when checking the channels for direct communication between the portable units in any of the steps, then the corresponding portable unit transmits and receives the audio data (e.g., digital data having a time-slot arrangement) to and from another portable unit which transmitted the direct access request signal, by using the detected channel. Thus, the portable unit makes an extension call to another calling portable unit through direct communication.

Figure 9:
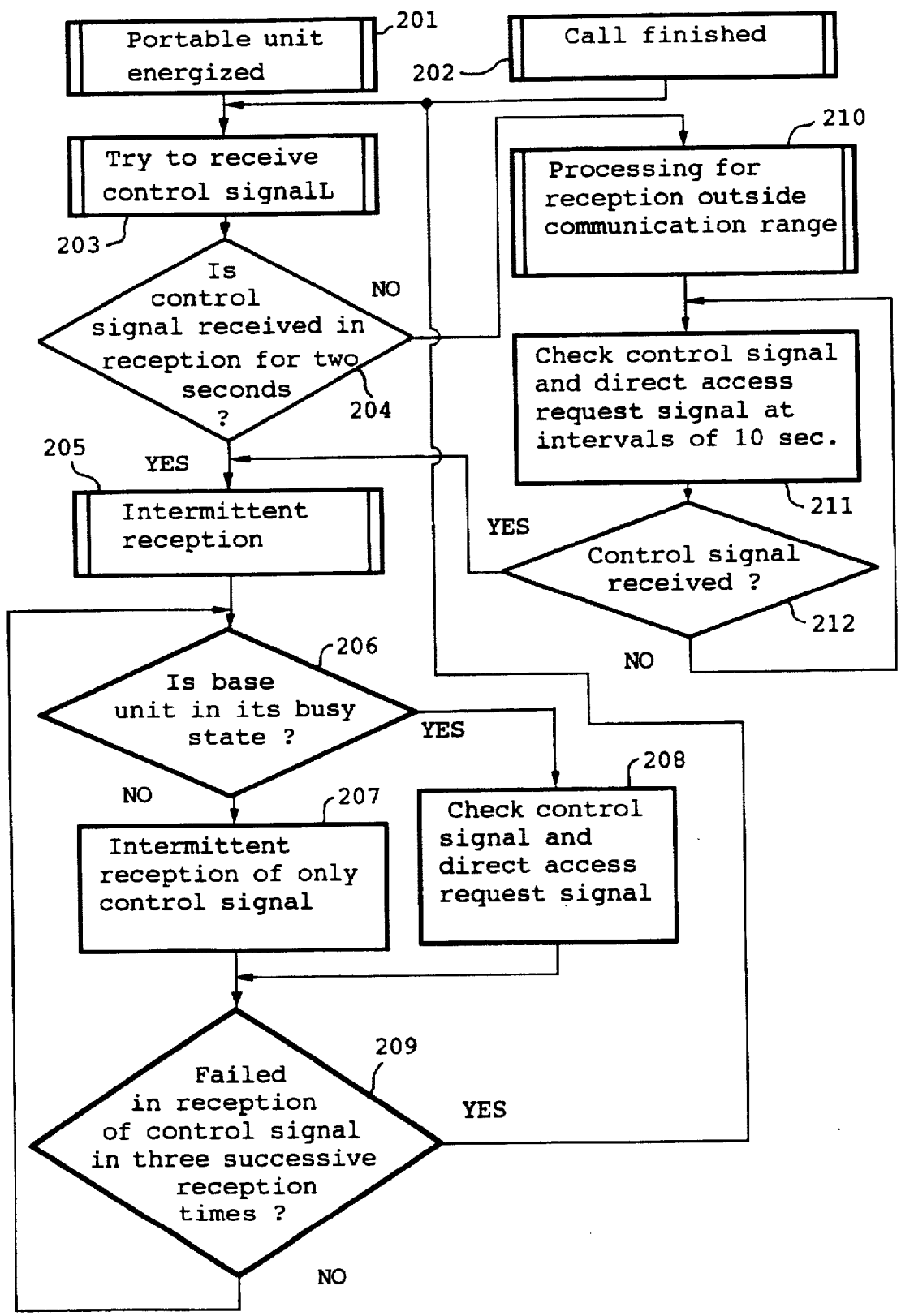
FIG. 9 is a flowchart showing a processing of the portable unit in its reception standby state according to the embodiment of the present invention.
Figure 10:
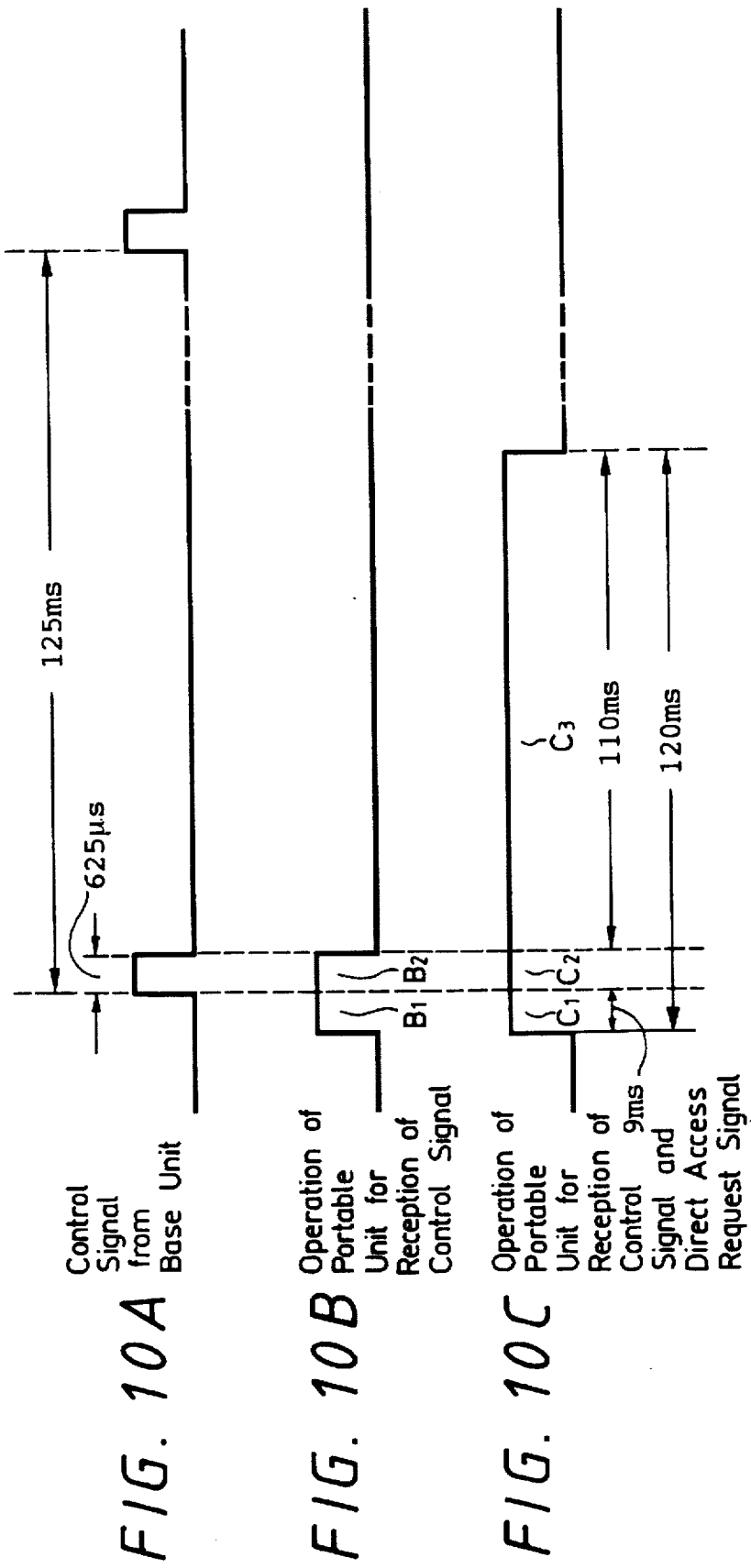
FIGS. 10A, 10B and 10C are diagrams showing a timing at which the portable unit carries out reception in its reception standby state according to the embodiment of the present invention.

The definition of the reception of the control signal in the acquisition processing carried out in accordance with the flowchart shown in FIG. 9 is to receive the control signal transmitted from the base unit belonging to the same system in which the common system code is allocated to all the units. Therefore, even if the reception unit of the portable unit receives a control signal transmitted from a base unit of another system in the acquisition processing, the reception unit disregards the received control signal.

According to the connection method of the digital cordless telephone apparatus of this embodiment, when the extension call between the portable units via the base unit is possible, this extension call between the portable units via the base unit is carried out. When the base unit has no free time slot for communication or when the portable unit is located outside the communication range of the base unit, the direct extension call between the portable units is carried out. In this case, the portable unit gives priority to the extension call between the portable units via the base unit and carries out the direct extension call between the portable units only when the extension call between the portable units via the base unit is impossible. Accordingly, only when the extension call between the portable units via the base unit is impossible, the portable unit must check the channels for the direct communication between the portable units in its reception standby state. As a result, it is not necessary for the portable unit to constantly carry out check processing, which requires a large consumed power, for checking the channels for the direct communication between the portable units (because the portable units carries out check processing only when the processing is required). This means that regardless of the state of the base unit, the portable unit of the digital cordless telephone apparatus which constantly allows the communication between the portable units can be operated with minimum consumed power. Therefore, it is possible to reduce the consumed power of the portable unit as compared with that required when the portable unit constantly checks the channels for direct communication between the portable units in its reception standby state, which leads to the advantage that it is possible to increase a duration time of a battery incorporated in the portable unit to that extent.

In this case, according to this embodiment, since the base unit transmits the control signal including the busy information, the portable unit can determine whether or not the extension call between the portable units via the base unit is possible, only by receiving the control signal. As a result, it is possible to simplify the processing of the portable unit for selecting the communication system.

While the extension call between the two portable units has been described in this embodiment, the present invention is not limited thereto. It is needless to say that the present invention can be applied to simultaneous communication among three portable units or greater.

While in this embodiment the busy information included in the control signal transmitted from the base unit is used for switching the control for the communication between the portable units, the present invention is not limited thereto. Another control processing carried out in the portable unit may be switched based on the busy information. For example, the busy information may be used when it is determined whether or not the outside call from the portable unit via the base unit is possible.

According to the present invention, when the base unit does not have a time slot to be used for communication and cannot receive the data having the time slot arrangement and transmitted from a certain portable unit, the base unit transmits the control signal including the information indicative of an incapability of the base unit to establish communication with the portable unit, thereby making it possible for the portable unit to determine whether or not the communication via the base unit is possible. Therefore, the portable unit can determine that the extension call between the portable units via the base unit and the outside call via the base unit are impossible. It is possible, however, for the portable units to communicate with each other.

According to the present invention, when it is impossible for a plurality of portable units to transmit the communication signals to one another via the base unit, the portable units automatically change the communication channels so as to carry out direct communication among the plurality of the portable units using the signals for communication between the portable units. This means that the portable unit can satisfactorily select suitable communication between the portable units via the base unit and the direct communication between the portable units. Therefore, when the communication between the portable units via the base unit is possible, the portable unit is brought in its standby state for reception of the control signal for the extension call between the portable units via the base unit. Only when the communication between the portable units via the base unit is impossible, the portable unit is also brought in its standby state for reception of any direct access request signal for direct communication between the portable units. It is possible to constantly make an extension call between the portable units with less consumed power being required during the standby state of the portable unit.

According to the present invention, when the base unit transmits the control signal indicative of an inability to establish communication with the portable unit, the portable unit switches the communication system to the direct communication between the portable units. As a result, when the base unit is in its busy state when it reaches the limit of its performance, the communication system is switched to the direct communication between the portable units. Therefore, it is possible to constantly make an extension call between the portable units without the user's switching operation such as the user being required to push a button of the portable unit, or the like.

According to the present invention, when the portable unit cannot receive the control signal from the base unit, the portable unit switches the system of the communication between the portable units to the direct communication between the portable units. Therefore, when the calling portable unit and the called portable unit are located outside the area which the radio wave from the base unit ranges, it is possible to constantly carry out the direct communication between the above two portable units without the user's switching operation such as the user being required to push a button of the portable unit, or the like.

Having described a preferred embodiment of the present invention with reference to the accompanying drawings, it is to be understood that the present invention is not limited to the above-mentioned embodiment and that various changes and modifications can be effected therein by one skilled in the art without departing from the spirit or scope of the present invention as defined in the appended claims.

What is claimed is:

1. A connection method of a digital cordless telephone apparatus which includes a base unit and a plurality of portable units, in which one channel is divided into frames in view of time, each frame being formed of a plurality of transmission slots and a plurality of reception slots, in which digital data is transmitted and received during respective periods of said transmission slots and said reception slots, and in which by using said plurality of transmission slots and reception slots in each of said frames, said base unit can communicate with said plurality of portable units and provide communication between one portable unit and another portable unit of said plurality of portable units via said base unit, said connection method being used to establish a connection for communication between a first calling side portable unit and a second called side portable unit of said plurality of portable units, comprising the steps of:

at said first portable unit, transmitting an access request signal for requesting a call to said second portable unit;

at said base unit receiving the access request signal and determining whether there are any transmission slots and reception slots available for connecting said first portable unit to said second portable unit via said base unit;

if there are any available transmission slots and reception slots, allowing a call between said first portable unit and said second portable unit by using the available slots;

if there are no available transmission slots and reception slots, transmitting a control signal including busy information;

at said first portable unit; determining whether it is possible to receive the control signal from said base unit; if said first portable unit can receive the control signal receiving the control signal and transmitting to said second portable unit a direct access request signal for requesting a call to said second portable unit; and at said second portable unit, receiving the direct access request signal, thereby communicating with said first portable unit.

2. A connection method of a digital cordless telephone apparatus according to claim 1, wherein portable units other than said first portable unit among said plurality of portable units are respectively switched to a standby state for reception of said direct access request signal when receiving said control signal including said busy information.

3. A connection method of a digital cordless telephone apparatus which includes a base unit and a plurality of portable units, in which one channel is divided into frames in view of time, each frame being formed of a plurality of transmission slots and a plurality of reception slots, in which digital data is transmitted and received during respective periods of said transmission slots and said reception slots, and in which by using said plurality of transmission slots and reception slots in each one of said frames, said base unit can communicate with said plurality of portable units and provide communication between one portable unit and another portable unit of said plurality of portable units via said base unit, said connection method being used to establish a connection for communication between a first calling side portable unit and a second called side portable unit of said plurality of portable units, comprising the steps of:

at said first portable unit, determining whether it is possible to receive a control signal from said base unit; if said first portable unit cannot receive said control signal, transmitting a direct access request signal to said second portable unit; and at said second portable unit, receiving the direct access request signal, thereby communicating with said first portable unit.

4. A connection method of a digital cordless telephone apparatus according to claim 3, wherein when said first portable unit of said plurality of portable units determines that it cannot receive said control signal, portable units other than said first portable unit are respectively switched to a standby state for reception of said control signal and said direct access request signal.

* * * * *